US005701961A

United States Patent [19]

Warner et al.

[11] Patent Number: 5,701,961

[45] Date of Patent: Dec. 30, 1997

[54] ELECTRONIC PUSH TO START NUTRUNNER

[75] Inventors: Donald R. Warner, Columbia Cross Roads; John A. McCallops, Sayre; John M. Estep, Granville Summit, all of Pa.

[73] Assignee: Ingersoll-Rand Company, Woodcliff Lake, N.J.

[21] Appl. No.: 676,022

[22] Filed: Jul. 5, 1996

[51] Int. Cl.$^6$ .......... B23B 21/00; B23B 17/00

[52] U.S. Cl. .......... 173/15; 173/4; 173/217

[58] Field of Search .......... 173/2, 4, 176, 173/178, 13, 15, 18, 217

[56] References Cited

U.S. PATENT DOCUMENTS

| | | | |
|---|---|---|---|
| 3,616,864 | 11/1971 | Sorensen | 173/176 |
| 4,265,320 | 5/1981 | Tanaka et al. | 173/178 |
| 4,298,072 | 11/1981 | Baker et al. | 173/15 |
| 4,300,282 | 11/1981 | Bunyea et al. | 173/15 |
| 4,488,604 | 12/1984 | Whitehouse | 173/178 |

*Primary Examiner*—Joseph J. Hail, III
*Assistant Examiner*—Jay A. Stelacone
*Attorney, Agent, or Firm*—Walter C. Vliet

[57] ABSTRACT

A latching magnetic switch is utilized to activate a push to start nutrunner or the like wherein the magnetic latching switch is deactivated first by one magnetic pole and thereafter upon engagement with the work piece and compression of the spindle and opposite pole of the magnet is utilized to activate the tool.

9 Claims, 2 Drawing Sheets

ELECTRONIC PUSH TO START NUTRUNNER

BACKGROUND OF THE INVENTION

With the advent of computer controlled tools in the vehicle assembly business there is a need for a push to start electronic nutrunner. Many assembly tools require the operator to depress a lever or button to activate the tool. This causes fatigue on the fingers and wrists since the operator has to operate the throttle as well as direct the tool into position. Existing push to start tools are typically controlled by mechanical clutches rather than computers. This limits them to the accuracy of the clutch and provides torque control only. Typical designs incorporate a series of contacting mechanical components which are required to activate the throttle switch and to provide the return mechanism to shut the tool off when the spindle is released. This complex mechanical assembly requires significant amounts of tuning and is limited in its durability. The mechanical clutch designs experience reliability problems and are typically quite costly due to their complexity.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing an electronic push to start nutrunner comprising a power driven nutrunner; an electronic power controller for controlling power to the nutrunner; the nutrunner being further provided with a retractable spindle; and means for magnetically sensing a retracted position of the retractable spindle and for providing a signal of the retracted position to the controller to initiate power to drive the nutrunner.

The foregoing and other aspects will become apparent from the following detailed description of the invention when considered in conjunction with the accompanying drawing figures.

BRIEF DESCRIPTION OF THE DRAWING FIGURES

FIG. 1 is a view illustrating a push to start nutrunner according to the present invention; and FIG. 2 shows a cross sectional view of a portion of a push to start nutrunner showing the elements of the present invention.

DETAILED DESCRIPTION

Figure 1:
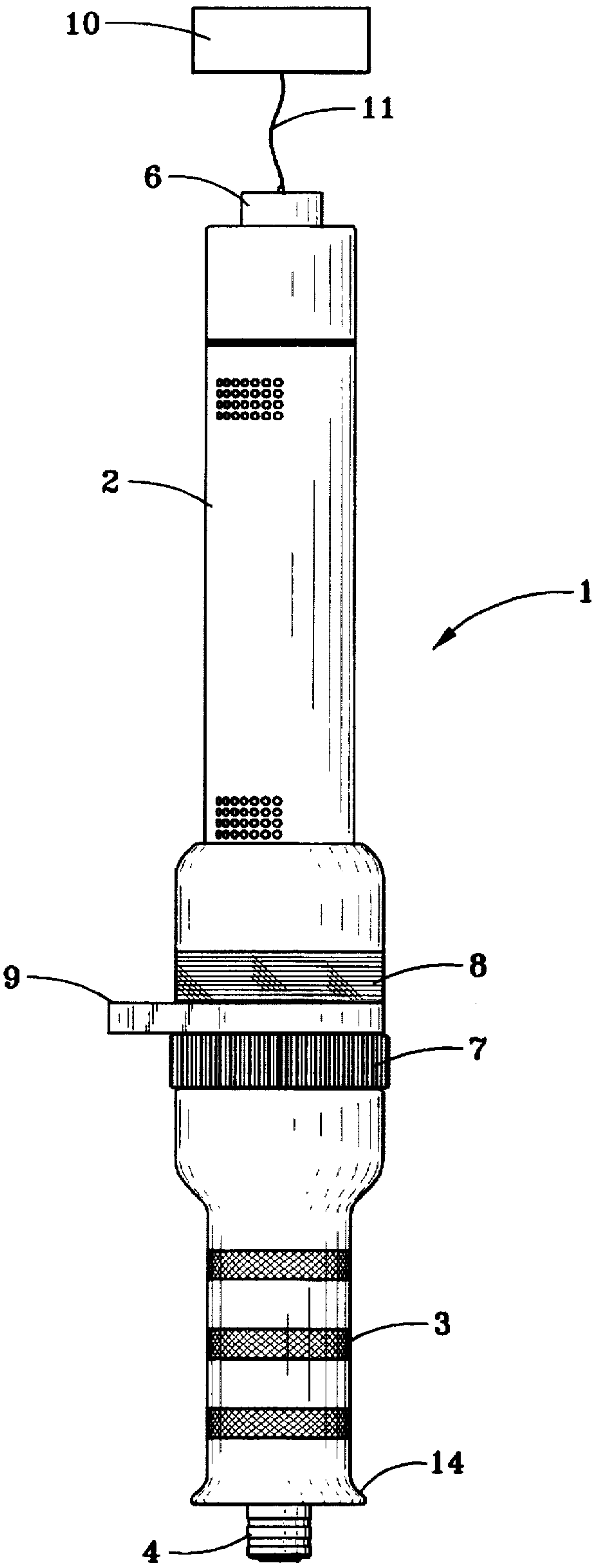

Referring to FIG. 1, a push to start nutrunner is shown and generally designated by the reference numeral 1. According to the preferred embodiment shown, the nutrunner is provided with an air cooled DC powered unit 2, a grip sleeve 3, and a quick change bit 4 for engaging a screwdriver bit or socket (not shown) which in turn would engage a work piece to be rotated (not shown). The nutrunner may be further provided with a control cable connector 6, a diagnostic light ring 8, a reverse drive activating ring 7, and a mounting flange 9 for suspending the nutrunner from a balancing device or the like (not shown).

This design allows the operator to attach a push to start DC power tool, such as that shown, to a computer control box 10 by means of a control cable 11. This permits the nutrunner or similar DC powered tool to have all the features of torque control, angle control, and diagnostic lights. In operation, torque and angle parameters can be monitored and the tool shut off when the desired parameters are met. According to the present invention the tool is "push to start" so the operator only pushes the socket or bit against the fastener to start the tool. The grip area or grip sleeve 3 has a flange 14 to rest the hand against to reduce the grip force required when pushing the tool to start. The reverse activating ring 7 can be rotated to select either clockwise or counterclockwise rotation of the tool output.

Figure 2:
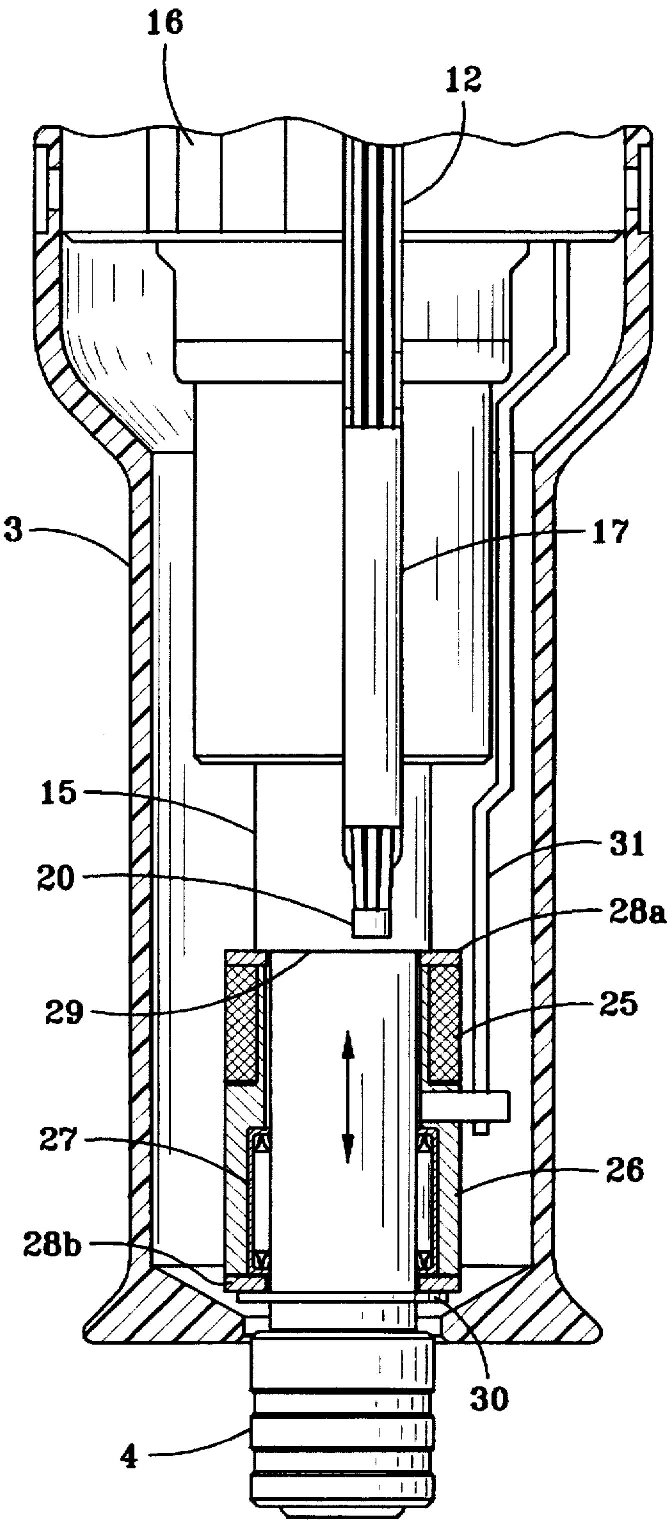

Referring now to FIG. 2, a switch mount in the form of a tubular conduit 12 extends from the control cable connector 6 to a position in the grip sleeve 3 proximate the output spindle 15. The output spindle 15 rotates in response to the driving force of a DC motor 16 (partially shown). A magnetic latching switch 20 is mounted at the terminus of the tubular conduit 12 and is connected in turn to a switch circuit 17 containing a transistor and resistor which provides a signal in response to the magnetic latching switch activation.

As shown in FIG. 2, a magnet 25 is disposed about the spindle 15 to permit rotation of the spindle 15 and is positioned to reciprocate with the spindle by means of a magnetic bearing sleeve 26 and a roller bearing 27. An opposed pair of thrust washers **28*a* and 28*b* respectively contain the magnetic assembly within the space defined by the limits of land 29 and retaining ring 30. A magnet retaining rod 31 permits the magnetic assembly to reciprocate along with the spindle but prevent the rotation of the magnet assembly in operation. The magnet retaining rod 31 is in turn secured to the motor 16 at a non-rotating point. The magnetic latching switch 20** is located near the spindle end of the tool so a long pushrod is not required to actuate a switch in the back of the tool as is common with the prior art.

The unique feature of this tools push to start mechanism is based on the pneumatic switch and its capabilities. The advantage of using a latching magnetic switch or sensor in place of a typical hall switch in this design is that the latching magnetic sensor requires a magnetic field to actuate the power tool and an opposite magnetic field to shut the tool off. In this design the magnet is attached to the output spindle in such a fashion that when the spindle is compressed or retracted the field required to shut off the latching magnetic switch or sensor passes by the latching magnetic switch first. As the spindle is compressed further the field required to start the tool passes the latching magnetic switch starting the tool. This makes it impossible for the latching magnetic switch to stay latched when the spindle pressure is released because the field required to shut off the latching magnetic switch must pass the latching magnetic switch when the spindle extends to its original non-operating position. Using this design we have the ability to provide a startup signal to the tool much earlier in the spindle compression than tools of the prior art.

Another feature of the present design is that the magnet does not rotate with the spindle. By not rotating with the spindle it is possible to provide the proper polarity and positioning of the magnet relative to the latching magnetic switch to eliminate any switching errors which could be caused by rotation. The present design eliminates moving mechanical parts that can wear or break therefore greatly improving product reliability and reducing costs.

Having described our invention in terms of a preferred embodiment we do not wish to be limited in the scope of our invention except as claimed.

What is claimed is:

1. A push to start nutrunner comprising:

a power driven nutrunner;

an electronic power controller for controlling power to said nutrunner;

said nutrunner being further provided with a retractable spindle; and means for magnetically sensing a retracted position of said retractable spindle and for providing a signal of said retracted position to said controller to initiate power to drive said nutrunner.

2. A push to start nutrunner according to claim 1 wherein:

said power driven nutrunner further comprises a DC electric power driven nutrunner.

3. A push to start nutrunner according to claim 1 wherein:

said means for magnetically sensing a retracted position of said retractable spindle and for providing a signal of said retracted position to said controller to initiate power to drive said nutrunner further comprises a latching magnetic switch.

4. A push to start nutrunner according to claim 3 wherein:

said electronic power controller for controlling power to said nutrunner further comprises a computer based controller which further controls a nutrunner tightening function.

5. A push to start nutrunner according to claim 3 wherein:

said magnetic latching switch requires a first magnetic pole signal to latch and a second opposite magnetic pole signal to unlatch and wherein said retractable spindle is provided with a magnet having opposite poles which activate said magnetic latching switch on moving from an extended position to a retracted position.

6. A push to start nutrunner according to claim 5 wherein:

powered operation of said nutrunner occurs only upon retraction of said spindle in response to said nutrunner being urged against and engaged with a work piece.

7. A push to start nutrunner according to claim 5 wherein:

upon retraction of said spindle said second opposite magnetic pole passes said magnetic latching switch first to assure unlatching of said magnetic latching switch followed by said first magnetic pole passing said magnetic latching switch to initiate a power tool operating cycle.

8. A push to start nutrunner according to claim 5 wherein:

upon extension of said spindle upon removal of said nutrunner from said work piece said first magnetic pole passes said magnetic latching switch first followed by said second opposite magnetic pole passing said magnetic latching switch to shut off said power tool.

9. A push to start nutrunner according to claim 5 wherein:

said magnet is mounted for reciprocation but not rotation with said retractable spindle.

* * * * *